United States Patent
Lee et al.

(10) Patent No.: US 9,620,795 B2
(45) Date of Patent: Apr. 11, 2017

(54) HEAT RECOVERY APPARATUS BASED ON FUEL CELL AND OPERATING METHOD THEREOF

(71) Applicant: Posco Energy Co., Ltd., Seoul (KR)

(72) Inventors: Hyun Lae Lee, Gyeongsangbuk-do (KR); Jung Tae Hwang, Seoul (KR); Ja Hoon Jeong, Gyeongsangbuk-do (KR); Sung Lay Ryu, Gyeongsangbuk-do (KR)

(73) Assignee: Posco Energy Co., Ltd. (KR)

( * ) Notice: Subject to any disclaimer, the term of this patent is extended or adjusted under 35 U.S.C. 154(b) by 250 days.

(21) Appl. No.: 14/367,586

(22) PCT Filed: Dec. 21, 2012

(86) PCT No.: PCT/KR2012/011216
§ 371 (c)(1),
(2) Date: Jun. 20, 2014

(87) PCT Pub. No.: WO2013/095026
PCT Pub. Date: Jun. 27, 2013

(65) Prior Publication Data
US 2014/0349206 A1 Nov. 27, 2014

(30) Foreign Application Priority Data
Dec. 22, 2011 (KR) .......................... 10-2011-014026

(51) Int. Cl.
*H01M 8/04* (2016.01)
*H01M 8/04007* (2016.01)
*H01M 8/04828* (2016.01)
*H01M 8/0432* (2016.01)
*H01M 8/0438* (2016.01)
*H01M 8/04492* (2016.01)
*H01M 8/04701* (2016.01)
(Continued)

(52) U.S. Cl.
CPC ..... *H01M 8/04074* (2013.01); *H01M 8/0432* (2013.01); *H01M 8/04298* (2013.01);
(Continued)

(58) Field of Classification Search
None
See application file for complete search history.

(56) References Cited

U.S. PATENT DOCUMENTS
2013/0029235 A1    1/2013   Kiyohiro et al.

FOREIGN PATENT DOCUMENTS
EP         2053680 A1    4/2009
JP       2005-016849 A   1/2005
(Continued)

OTHER PUBLICATIONS

Supplemental Search Report for corresponding European Application No. 12858848, dated Apr. 15, 2015.
International Search Report for Application No. PCT/KR2012/011216 dated Apr. 16, 2013.

*Primary Examiner* — Daniel Gatewood
(74) *Attorney, Agent, or Firm* — Lerner, David, Littenberg, Krumholz & Mentlik, LLP

(57) ABSTRACT

Provided are a heat recovery apparatus based on a fuel cell and an operating method thereof. In the fuel cell-based heat recovery apparatus and the operating method thereof, hot water and steam may be generated by using heat generated while a molten carbonate fuel cell (MCFC) operates to supply the generated hot water or steam to buildings, thereby reducing a rate of operation in cooling/heating equipment using electricity so as to reduce air-conditioning costs.

13 Claims, 6 Drawing Sheets

(51) Int. Cl.
  *H01M 8/04746*    (2016.01)
  *H01M 8/04298*    (2016.01)
  *H01M 8/14*       (2006.01)

(52) U.S. Cl.
  CPC ... *H01M 8/04373* (2013.01); *H01M 8/04425* (2013.01); *H01M 8/04492* (2013.01); *H01M 8/04738* (2013.01); *H01M 8/04776* (2013.01); *H01M 8/04828* (2013.01); *F24D 2200/19* (2013.01); *H01M 2008/147* (2013.01); *H01M 2250/10* (2013.01); *H01M 2250/405* (2013.01); *Y02B 90/14* (2013.01); *Y02B 90/16* (2013.01); *Y02E 60/526* (2013.01)

(56) References Cited

FOREIGN PATENT DOCUMENTS

| | | | |
|---|---|---|---|
| JP | 2005-055033 A | | 3/2005 |
| JP | 2005055033 A | * | 3/2005 |
| JP | 2006-024431 A1 | | 1/2006 |
| JP | 2006-032140 A | | 2/2006 |
| JP | 2006-236734 A | | 9/2006 |
| JP | 2007-141693 A | | 6/2007 |
| JP | 2007-280970 A | | 10/2007 |
| JP | 2008-269930 A | | 11/2008 |
| JP | 2010-027580 A | | 2/2010 |
| JP | 2010-153064 A | | 7/2010 |
| JP | 2010-211987 A | | 9/2010 |
| JP | 2010-272342 A | | 12/2010 |
| JP | 2010-277961 A | | 12/2010 |
| JP | 2010277961 A | * | 12/2010 |
| JP | 2011003417 A | | 1/2011 |
| JP | 2011-091004 A | | 5/2011 |
| JP | 2011-228182 A | | 11/2011 |
| KR | 10-0464203 B1 | | 1/2005 |
| WO | 2010/123146 A1 | | 10/2010 |
| WO | 2011-132486 A1 | | 10/2011 |

* cited by examiner

HEAT RECOVERY APPARATUS BASED ON FUEL CELL AND OPERATING METHOD THEREOF

CROSS-REFERENCE TO RELATED APPLICATION

This application is a national phase entry under 35 U.S.C. §371 of International Application No. PCT/KR2012/011216, filed Dec. 21, 2012, which claims priority to Korean Patent Application No. 10-2011-0140426, filed on Dec. 22, 2011, the disclosures of which are incorporated herein by reference.

TECHNICAL FIELD

The present invention relates to a heat recovery apparatus based on a fuel cell and an operating method thereof, and more particularly, to a fuel cell-based heat recovery apparatus for buildings, which generates hot water or steam by using heat generated while a molten carbonate fuel cell (MCFC) operates and an operation method thereof.

BACKGROUND ART

Molten carbonate fuel cells (MCFCs) are power generating units that are drawing attention as the upcoming renewable energy because MCFCs have high power generating efficiency of about 47% and low fuel consumption and carbon gas emission. Since MCFCs with a Li/Na electrolyte uses a molten carbonate electrolyte to generate carbonate ions that react with hydrogen, the MCFCs may operate at a high temperature of about 650° C.

Such a MCFC may generate waste heat having a temperature of about 350° C. while operating. Thus, the MCFC may be interlocked with a heat recovery unit (HRU) by using the generated waste heat. Here, the HRU may be a unit that recovers residual heat of exhaust gases or discharged hot water to supply cooling/heating air and hot water. That is, the HRU may represent heat equipment for heat generation, heat transport, heat use, heat exchange, and the like.

In recent years, a 100 kW class MCFC that has been developed to respond to the load of a single building is linked with the HRU to supply cooling/heating air and hot water, which are used in the building. Thus, methods for increasing generation efficiency of the MCFC to about 50% to about 60% are being required.

DISCLOSURE OF THE INVENTION

Technical Problem

To solve the foregoing limitation, the prevent invention provides a fuel cell-based heat recovery apparatus that generates hot water or steam by using heat generated while a molten carbonate fuel cell (MCFC) operates to supply the generated hot water or steam to a building, thereby reducing a rate of operation in cooling/heating equipment using electricity to reduce air-conditioning costs, and an operating method thereof.

The object of the present invention are the above-mentioned purpose is not limited, not mentioned in the other objects and advantages of the present invention by the following description can be understood, embodiments of the invention will become apparent by. Also, the objects and advantages of the present invention the means as claimed and combinations thereof can be easily realized by it will be seen.

Technical Solution

According to an aspect of the present invention, there is a fuel cell-based heat recovery apparatus including: a first switching unit introducing heat generated by a molten carbonate fuel cell (MCFC) into a heat exchanger or blocking the introduction of the heat into the heat exchanger; a switching unit discharging the heat through a discharge hole or blocking the discharge of heat through the discharge hole; a third switching unit introducing a fluid stored in a condensed tank into a fluid circulating unit or blocking the introduction of the fluid into the fluid circulating unit; the fluid circulating unit circulating the fluid introduced by the third switching unit; a state sensing unit measuring a temperature of the heat generated by the MCFC, a flow rate within a tube through which the fluid passes, and a temperature and water level within the condensed tank; and a control unit controlling each of the units according to an operating or stopping algorithm.

According to another aspect of the present invention, there is a method of operating a fuel cell-based heat recovery apparatus including a first switching unit, a second switching unit, a third switching unit, a fluid circulating unit, a state sensing unit, and a control unit, the method including: maintaining a standby state; opening the third switching unit because a temperature within a condensed tank is below a first critical value, and a water level within the condensed tank is above a second critical value; operating the fluid circulating unit when a second critical time elapses after the third switching unit is opened; opening the first switching unit when a third critical time elapses after the fluid circulating unit operates; and closing the second switching unit when a flow rate sensed by the state sensing unit satisfies a third critical value after the first switching unit is opened.

According to further another aspect of the present invention, there is a method of stopping an operation of a fuel cell-based heat recovery apparatus including a first switching unit, a second switching unit, a third switching unit, a fluid circulating unit, a state sensing unit, and a control unit, the method including: closing the first switching unit after the second switching unit is opened because a predetermined condition is satisfied; stopping an operation of the fluid circulating unit when a fifth critical time elapses after the first switching unit is closed; and closing the third switching unit when a sixth critical time elapses after the operation of the fluid circulating unit is stopped.

Advantageous Effects

According to the present invention, the hot water and steam may be generated by using heat generated while the MCFC operates to supply the generated hot water or steam to buildings, thereby reducing a rate of operation in cooling/heating equipment using electricity so as to reduce air-conditioning costs.

MODE FOR CARRYING OUT THE INVENTION

Advantages and features of the present invention, and implementation methods thereof will be clarified through following embodiments described with reference to the accompanying drawings. Also, these embodiments are provided so that this disclosure will be thorough and complete, and will fully convey the scope of the present invention to those skilled in the art. Moreover, detailed descriptions related to well-known functions or configurations will be ruled out in order not to unnecessarily obscure subject matters of the present invention. Preferred embodiments of the inventive concept will be described below in more detail with reference to the accompanying drawings.

Figure 1:
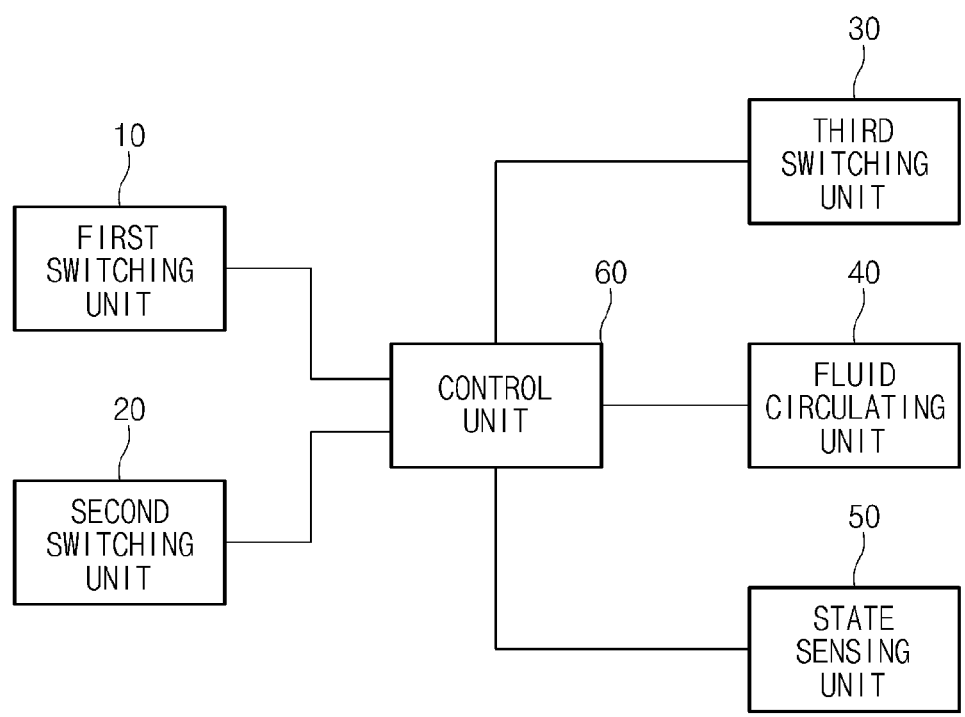
FIG. 1 is a view of a heat recovery apparatus based on a fuel cell according to an embodiment of the present invention.

FIG. 1 is a view of a heat recovery apparatus based on a fuel cell according to an embodiment of the present invention.

Referring to FIG. 1, a fuel cell-based heat recovery apparatus according to the present invention includes a first switching unit 10, a second switching unit 20, a third switching unit 30, a fluid circulating unit 40, a state sensing unit 50, and a control unit 60.

Here, the first switching unit 10 and the second switching unit 20 may be respectively provided in tubes through which high-temperature heat generated by fuel cells passes to block or permit a flow of the heat.

Also, the third switching unit 30 and the fluid circulating unit 40 may be provided in tubes through which a fluid such as hot water and steam passes to block or permit a flow of the fluid.

Explaining each of the above-described components, the first switching unit 10 may be, for example, a valve that operates by an electrical signal. Thus, the high-temperature heat that is generated by molten carbonate fuel cells (MCFCs) to flow through the tube may be introduced or not be introduced into a heat exchanger by the first switching unit 10 according to a control signal transmitted from the control unit 60. Here, the heat exchanger may heat water flowing flows along the tube by using the high-temperature heat introduced therein to generate a fluid such as hot water and steam.

The second switching unit 20 may be, for example, a valve that operates by an electrical signal. Thus, the high-temperature heat that is generated by the MCFCs to flow through the tube may be discharged or not be discharged through a vent by the second switching unit 20 according to a control signal transmitted from the control unit 60.

The third switching unit 30 may be, for example, a valve that operates by an electrical signal. Thus, the hot water and stream stored in a condensed tank may be introduced or not be introduced into the fluid circulating unit 40 by the third switching unit 30 according to a control signal transmitted from the control unit 60.

The fluid circulating unit 40 may circulate the fluid introduced by the third switching unit 30 according to the control signal of the control unit 60.

Figure 2:
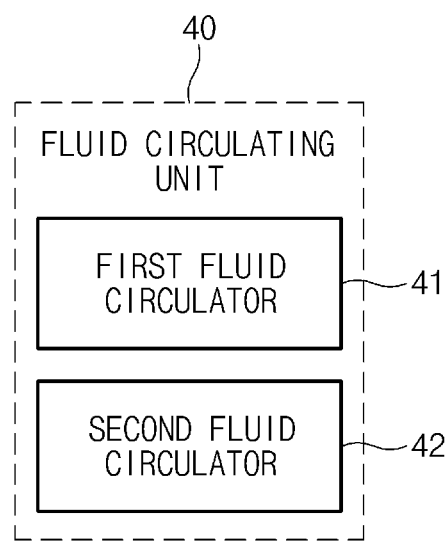
FIG. 2 is a detailed view illustrating a fluid circulating unit of the heat recovery apparatus based on the fuel cell according to the present invention.

As illustrated in FIG. 2, the fluid circulating unit 40 may include a first fluid circulator 41 and a second fluid circulator, but the present invention is not limited thereto.

The state sensing unit 50 may be provided with a temperature sensor in the tube through which the high temperature heat passes to measure a temperature of the heat. Also, the state sensing unit 50 may be provided with a flow rate sensor in the tube through which the fluid passes to measure a flow rate of the fluid. In addition, the state sensing unit 50 may be provided with a temperature sensor and a water level sensor in the condensed tank to measure a temperature and water level.

Figure 3:
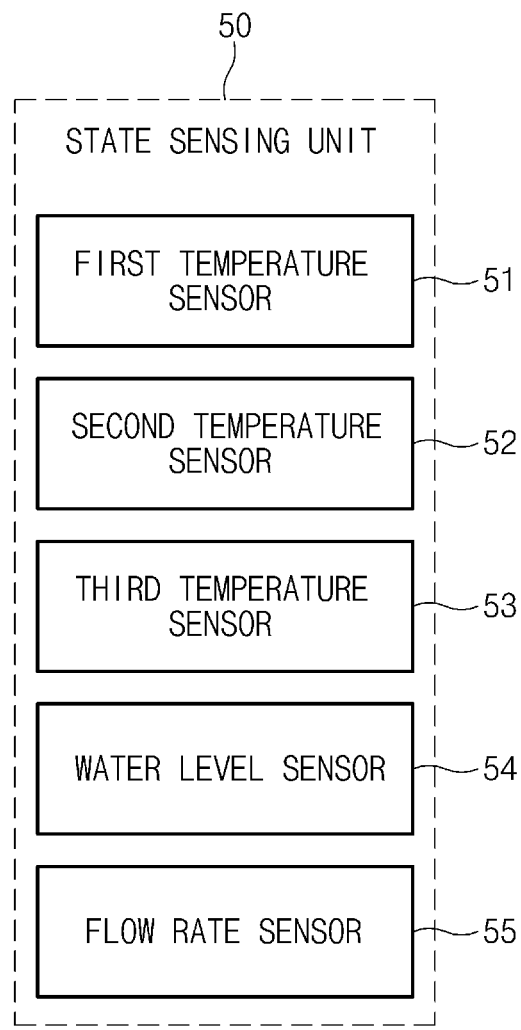
FIG. 3 is a detailed view of a state sensing unit of the heat recovery apparatus based on the fuel cell according to the present invention.

That is, as illustrated in FIG. 3, the state sensing unit 50 may include a first temperature sensor (TT 100) 51, a second temperature sensor (TT 103) 52, a third temperature sensor (TT 104) 53, a water level sensor (LS 100) 54, and a flow rate sensor (FT 100) 55.

Figure 4:
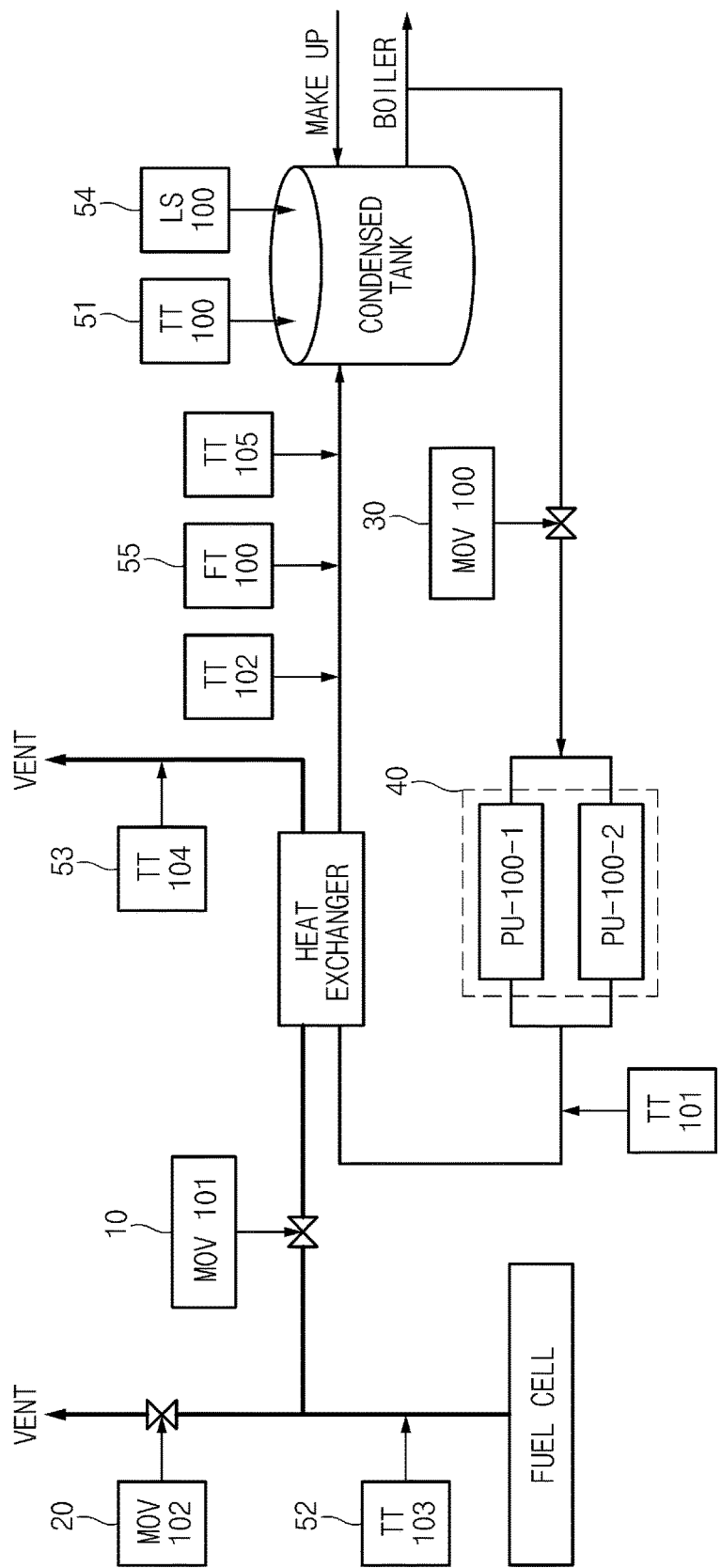
FIG. 4 is a view of a heat recovery system based on a fuel cell according to an embodiment of the present invention.

Hereinafter, each of the components will be described in detail with reference to FIG. 4.

The first temperature sensor 51 is dispose din the condensed tank to measure a temperature within the condensed tank.

The second temperature sensor 52 is disposed in the tube through which the high-temperature heat generated by the fuel cells passes to measure a temperature of the heat.

The third temperature sensor 53 measures a temperature of the heat passing through the heat exchanger.

The water level sensor 54 senses a water level within the condensed tank.

The flow rate sensor 55 measures a flow rate of the hot water passing through the heat exchanger.

The control unit 60 controls operations of the first switching unit (MOV 101) 10, the second switching unit (MOV 102) 20, the third switching unit (MOV 100) 30, the fluid circulating unit (PM-100) 40, and the state sensing unit 50 according to an operation algorithm on each condition.

That is, in a case where the fuel cells are in an initial heat-up condition, if a critical condition (at least one of a temperature, pressure, and time) is satisfied in a state where the first and second switching units 10 and 20 are closed, the control unit 60 may open all the first and second switching units 10 and 20.

Thereafter, when a predetermined time (for example, about three minutes) elapses, the first switching unit may be closed. Here, the fluid circulating unit 40 may not operate, and the third switching unit 30 may be maintained in the closed state.

Also, the control unit 60 controls each of the components in reverse order of the heating condition when the fuel cells are stopped in operation to become in a cool down condition.

Also, in a case where the control unit 60 senses an error, when all the first and second switching units 10 and 20 are opened, and then, a predetermined time (for example, about three minutes) elapses, the control unit 60 may close the first switching unit 10 (an error mode).

Also, in a case where a standby state (a standby mode) in which power transmission of the fuel cells is confirmed becomes, when all the first and second switching units 10 and 20 are opened, and then, a predetermined time (for example, about three minutes) elapses, the control unit 60 may close the first switching unit 10. Here, the fluid circulating unit 40 may not operate, and the third switching unit 30 may be maintained in the closed state.

Also, in a case where a process for turning on the heat recovery apparatus is performed in the standby state (here, the second switching unit 20 is opened), when a temperature within the condensed tank, which is sensed through the first temperature sensor 51, is below a first critical valve (for example, about 100° C.), a water level within the condensed tank, which is sensed through the water level sensor 54, is above a second critical value (for example, about 30% of a storage capacity of the condensed tank), the control unit 60 may open the third switching unit 30. Here, an alarm for informing an abnormal operation of the heat recovery apparatus has not to operate.

Thereafter, when a predetermined time (for example, about one minute) elapses after the third switching unit 30 is opened, the fluid circulating unit 40 may operate.

Then, when a predetermined time (for example, about one minute) elapses after the fluid circulating unit 40 operates, the first switching unit 10 may be opened by a predetermined degree (for example, about 10%). Also, when a predetermined time (for example, about ten minutes) elapses after the first switching unit 10 is opened by the predetermined degree, the first switching unit 10 may be fully opened.

Here, a reason in which the first switching unit 10 is opened after the fluid circulating unit 40 operates, and then, the predetermined time (for example, about ten minutes) elapses is for removing air within the tube. Also, a reason in which the first switching unit 10 is opened by a degree of about 10% when the first switching unit 10 is initially opened, and then the predetermined time (for example, about ten minutes) elapses is for reducing thermal shock.

Thereafter, when the first switching unit 10 is fully opened, and the flow rate sensed through the flow rate sensor 55 satisfies a third critical value (for example, about 29 LPM to about 30 LPM), the second switching unit 20 may be closed. Here, when the error occurs, the error mode may be performed.

Also, in a case where a process for turning off the heat recovery apparatus is performed in the operating state (here, the first switching unit 10 is opened, and the second switching unit 20 is closed), when an output of the fuel cells is below a reference value (for example, about 100 kw), the temperature within the condensed tank, which is sensed by the temperature sensor 51, is above about 115° C., the water level within the condensed tank, which is sensed by the water level sensor 54, is below about 30%, the temperature sensed by the second temperature sensor 52 is below about 350° C., the temperature sensed by the third temperature sensor 53 is above about 200° C., the flow rate sensed by the flow rate sensor 55 is maintained for about five minutes at a flow rate of about 25 LPM or less, or the stopping alarm operates, the control unit 60 may open the second switching unit 20.

Thereafter, when the second switching unit 20 is opened, the first switching unit 10 may be closed.

Then, when the first switching unit 10 is fully closed, the fluid circulating unit 40 may be stopped in operation after a predetermined time (for example, about ten minutes) elapses.

Thereafter, when a predetermined time (for example, about one minute) elapses after the fluid circulating unit 40 is stopped in operation, the third switching unit 30 may be closed.

In a case where a winter season emergency operating mode is performed in the standby state, when water within the tube is maintained for about five minutes at a temperature of about 5° C. or less, or the emergency operating alarm operates, the third switching unit 30 may be opened. Here, the temperature of the water within the tube may be measured by the first temperature sensor 51. In FIG. 4, the temperature of the water within the tube may be measured through the "TT 101" or "TT 102".

Thereafter, when it is determined that the third switching unit 30 is opened, the fluid circulating unit 40 may operate.

Then, when a predetermined time (for example, about one hour) elapses after the fluid circulating unit 40 operates, the fluid circulating unit 40 may be stopped in operation.

Thereafter, when a predetermined time (for example, about one minute) elapses after the fluid circulating unit 40 is stopped in operation, the third switching unit 30 may be closed.

Then, when the water within the tube is maintained for about five minutes at a temperature of about 5° C. or less, the above-described processes may be repeatedly performed to re-operate.

Figure 5:
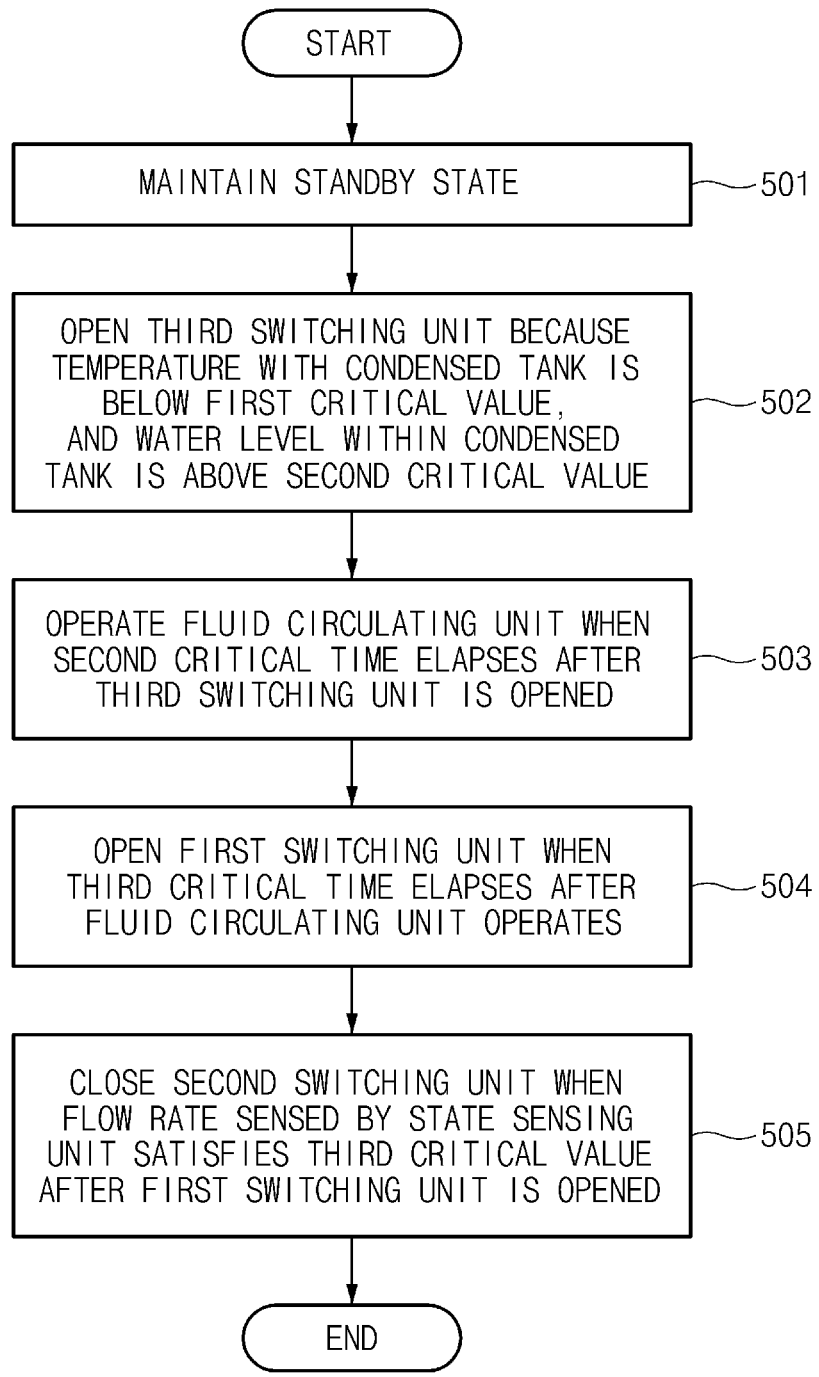
FIG. 5 is a flowchart illustrating an operating method of the heat recovery apparatus based on the fuel cell according to an embodiment of the present invention.

FIG. 5 is a flowchart illustrating an operating method of the heat recovery apparatus based on the fuel cell according to an embodiment of the present invention.

In operation 501, a standby state is maintained. Here, the standby state may represent a state in which the fluid circulating unit 40 does not operate, and the third switching unit 30 is maintained in the closed state when a predetermined time (for example, about three minutes) after all first and second switching units 10 and 20 are opened.

In operation 502, the third switching unit 30 is opened because a temperature within a condensed tank is below a first critical value, and a water level within the condensed tank is above a second critical value.

In operation 503, when a second critical time elapses after the third switching unit 30 is opened, a control unit 60 operates the fluid circulating unit 40.

In operation 504, when a third critical time elapses after the fluid circulating unit 40 operates, the first switching unit 10 is opened.

In operation 505, when a flow rate sensed by a flow rate sensor 55 of a state sensing unit 50 satisfies a third critical value, the control unit 60 closes the second switching unit 20.

Figure 6:
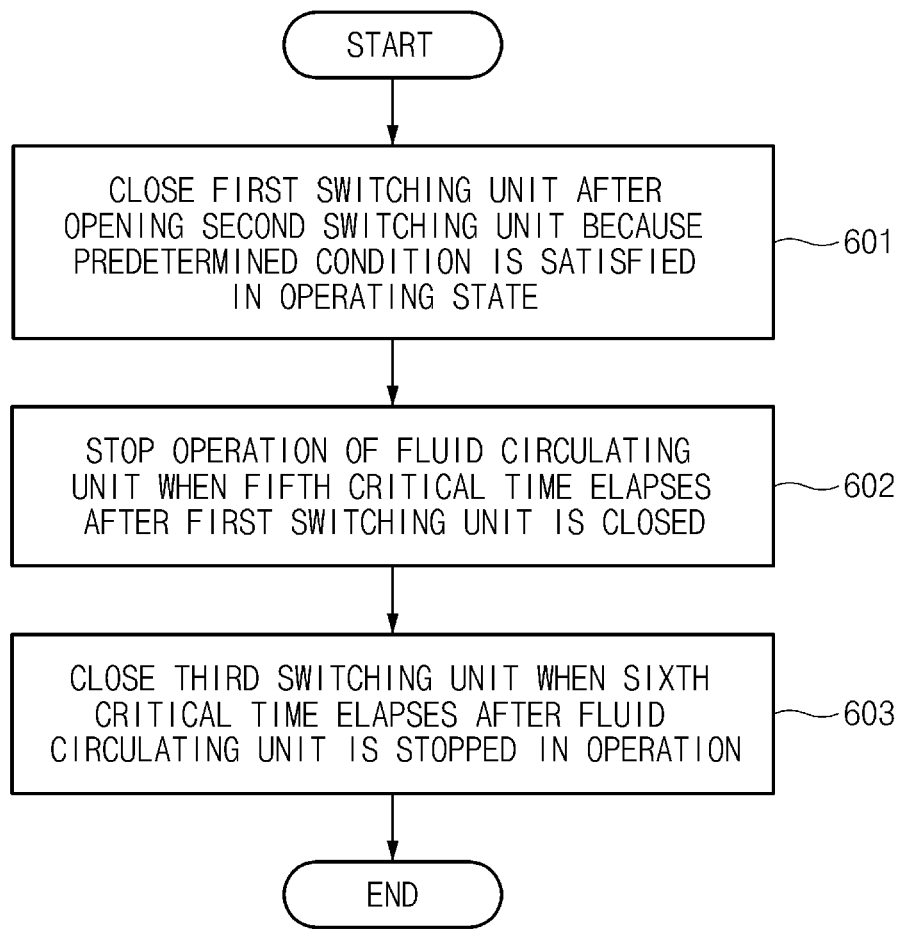
FIG. 6 is a flowchart illustrating an operation stopping method of the heat recovery apparatus based on the fuel cell according to an embodiment of the present invention.

FIG. 6 is a flowchart illustrating an operation stopping method of the heat recovery apparatus based on the fuel cell according to an embodiment of the present invention.

In operation 601, the control unit 60 opens the second switching unit 20 as a predetermined condition is satisfied to close the first switching unit 10 in an operating state.

Here, the predetermined condition may represent a case in which the output of the fuel cells is below a reference value, the temperature within the condensed tank is above the first critical temperature, the water level within the condensed tank is below the critical level, the temperature sensed by the second temperature sensor is below the second critical temperature, the temperature sensed by the third temperature sensor is above the third critical temperature, the flow rate sensed by the flow rate sensor is maintained for a predetermined time, or the stopping alarm operates.

In operation 602, when a fifth critical time elapses after the first switching unit 10 is closed, the fluid circuit circulating unit 40 is stopped in operation.

In operation 603, when a sixth critical time elapses after the fluid circulating unit 40 is stopped in operation, the control unit 60 closes the third switching unit 30.

As described above, the control method according to the present invention can be prepared by a computer program. Further, a code and code segment configuring the program may be easily inferred by a computer programmer in the related art. In addition, the prepared programs are stored in a computer readable recording medium (information storage medium) and are read and executed by the computer, thereby implementing the method of the present invention. Further, the recording medium includes all the types of computer readable recording media.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention may be utilized for air-conditioning buildings.

The invention claimed is:

1. A heat recovery apparatus comprising:
   a first switching unit introducing heat generated by a molten carbonate fuel cell (MCFC) into a heat exchanger or blocking the introduction of the heat into the heat exchanger;
   a second switching unit directly discharging the heat to an outside of the heat recovery apparatus through a discharge hole or blocking the discharge of heat through the discharge hole;
   a third switching unit introducing a fluid stored in a condensed tank into a fluid circulating unit or blocking the introduction of the fluid into the fluid circulating unit;
   the fluid circulating unit circulating the fluid introduced by the third switching unit;
   a state sensing unit measuring a temperature of the heat generated by the MCFC, a flow rate within a tube through which the fluid passes, and a temperature and water level within the condensed tank; and
   a control unit controlling the first switching unit, the second switching unit, the third switching unit, the fluid circulating unit and the state sensing unit according to an operating or stopping algorithm,
   wherein the control unit is configured, when a standby state is performed, to open all the first and second switching units, close the first switching unit after a first predetermined time elapses, maintain the fluid circulating unit in a stopped state, and maintain the third switching unit in a closed state.

2. The heat recovery apparatus of claim 1, wherein the state sensing unit comprises:
   a third temperature sensor measuring a temperature of the heat passing through the heat exchanger;
   a water level sensor sensing the water level within the condensed tank; and
   a flow rate sensor measuring a flow rate of hot water passing through the heat exchanger.

3. The heat recovery apparatus of claim 2, wherein, when the operating algorithm is performed in the standby state, the control unit opens the third switching unit when the temperature within the condensed tank is below a predetermined temperature, and the water level within the condensed tank is above a predetermined level, operates the fluid circulating unit after a second predetermined time elapses, opens the first switching unit after a third predetermined time elapses, and closes the second switching unit when the flow rate sensed by the flow rate sensor satisfies a predetermined flow rate.

4. The heat recovery apparatus of claim 3, wherein the control unit opens the first switching unit by a predetermined degree when a third predetermined time elapses after the fluid circulating unit operates and fully opens the first switching unit when a fourth predetermined time elapses after the first switching unit is opened by the predetermined degree.

5. The heat recovery apparatus of claim 1, wherein the state sensing unit comprises:
   a first temperature sensor measuring a temperature within the condensed tank;
   a second temperature sensor measuring a temperature of the heat generated by the MCFC;
   a third temperature sensor measuring a temperature of the heat passing through the heat exchanger;
   a water level sensor sensing the water level within the condensed tank; and
   a flow rate sensor measuring a flow rate of the hot water passing through the heat exchanger.

6. The heat recovery apparatus of claim 5, wherein, when the stopping algorithm is performed, since a predetermined condition is satisfied, the control unit closes the first switching unit after opening the second switching unit, stops an operation of the fluid circulating unit after a fifth predetermined time elapses, and close the third switching unit after a sixth predetermined time elapses.

7. The heat recovery apparatus of claim 6, wherein the predetermined condition corresponds to a case in which an output of the MCFC is below a reference value, the temperature within the condensed tank is above a first predetermined temperature, the water level within the condensed tank is below a predetermined level, the temperature sensed by the second temperature sensor is below a second predetermined temperature, the temperature sensed by the third temperature sensor is above a third predetermined temperature, the flow rate sensed by the flow rate sensor is maintained for a predetermined time, or the stopping alarm operates.

8. The heat recovery apparatus of claim 2, wherein, when winter season emergency operating mode is performed in the standby state, since the temperature of the fluid within the tube is maintained for a seventh predetermined time at a value that is below a predetermined value, the control unit opens the third switching unit, operates the fluid circulating unit, stops the operation of the fluid circulating unit after an eighth predetermined time elapses, and closes the third switching unit after a ninth predetermined time elapses.

9. The heat recovery apparatus of claim 8, wherein the control unit periodically checks whether the temperature of the fluid is maintained for the seventh predetermined time at the value that is below the predetermined temperature.

10. A heat recovery apparatus comprising:
    a first switching unit introducing heat generated by a molten carbonate fuel cell (MCFC) into a heat exchanger or blocking the introduction of the heat into the heat exchanger;
    a second switching unit discharging the heat through a discharge hole or blocking the discharge of heat through the discharge hole;
    a third switching unit introducing a fluid stored in a condensed tank into a fluid circulating unit or blocking the introduction of the fluid into the fluid circulating unit;
    the fluid circulating unit circulating the fluid introduced by the third switching unit;
    a state sensing unit measuring a temperature of the heat generated by the MCFC, a flow rate within a tube through which the fluid passes, and a temperature and water level within the condensed tank; and a control unit controlling the first switching unit, the second switching unit, the third switching unit, the fluid circulating unit and the state sensing unit according to an operating or stopping algorithm, wherein the control unit is configured, when a standby state is performed, to open all the first and second switching units, close the first switching unit after a first predetermined time elapses, maintain the fluid circulating unit in a stopped state, and maintain the third switching unit in a closed state, wherein the state sensing unit comprises a third temperature sensor measuring a temperature of the heat passing through the heat exchanger, a water level sensor sensing the water level within the condensed tank, and a flow rate sensor measuring a flow rate of hot water passing through the heat exchanger, wherein, when the operating algorithm is performed in the standby state, the control unit opens the third switching unit when the temperature within the condensed tank is below a predetermined temperature, and the water level within the condensed tank is above a predetermined level, operates the fluid circulating unit after a second predetermined time elapses, opens the first switching unit after a third predetermined time elapses, and closes the second switching unit when the flow rate sensed by the flow rate sensor satisfies a predetermined flow rate.

11. The heat recovery apparatus of claim 10, wherein the control unit opens the first switching unit by a predetermined degree when a third predetermined time elapses after the fluid circulating unit operates and fully opens the first switching unit when a fourth predetermined time elapses after the first switching unit is opened by the predetermined degree.

12. A heat recovery apparatus comprising:
a first switching unit introducing heat generated by a molten carbonate fuel cell (MCFC) into a heat exchanger or blocking the introduction of the heat into the heat exchanger;
a second switching unit discharging the heat through a discharge hole or blocking the discharge of heat through the discharge hole;
a third switching unit introducing a fluid stored in a condensed tank into a fluid circulating unit or blocking the introduction of the fluid into the fluid circulating unit;
the fluid circulating unit circulating the fluid introduced by the third switching unit;
a state sensing unit measuring a temperature of the heat generated by the MCFC, a flow rate within a tube through which the fluid passes, and a temperature and water level within the condensed tank; and
a control unit controlling the first switching unit, the second switching unit, the third switching unit, the fluid circulating unit and the state sensing unit according to an operating or stopping algorithm,
wherein the control unit is configured, when a standby state is performed, to open all the first and second switching units, close the first switching unit after a first predetermined time elapses, maintain the fluid circulating unit in a stopped state, and maintain the third switching unit in a closed state,
wherein the state sensing unit comprises a first temperature sensor measuring a temperature within the condensed tank, a second temperature sensor measuring a temperature of the heat generated by the MCFC, a third temperature sensor measuring a temperature of the heat passing through the heat exchanger, a water level sensor sensing the water level within the condensed tank, and a flow rate sensor measuring a flow rate of the hot water passing through the heat exchanger,
wherein, when the stopping algorithm is performed, since a predetermined condition is satisfied, the control unit closes the first switching unit after opening the second switching unit, stops an operation of the fluid circulating unit after a fifth predetermined time elapses, and close the third switching unit after a sixth predetermined time elapses.

13. The heat recovery apparatus of claim 12, wherein the predetermined condition corresponds to a case in which an output of the MCFC is below a reference value, the temperature within the condensed tank is above a first predetermined temperature, the water level within the condensed tank is below a predetermined level, the temperature sensed by the second temperature sensor is below a second predetermined temperature, the temperature sensed by the third temperature sensor is above a third predetermined temperature, the flow rate sensed by the flow rate sensor is maintained for a predetermined time, or the stopping alarm operates.

* * * * *